United States Patent [19]
Stephen et al.

[11] Patent Number: 5,469,835
[45] Date of Patent: Nov. 28, 1995

[54] CHARCOAL IGNITER

[75] Inventors: James C. Stephen, Arlington Heights; Erich J. Schlosser, Barrington; Ewald Sieg, Palatine, all of Ill.

[73] Assignee: Weber-Stephen Products Co., Palatine, Ill.

[21] Appl. No.: 282,872

[22] Filed: Jul. 29, 1994

[51] Int. Cl.[6] .................................................. A47J 37/00
[52] U.S. Cl. ........................ 126/25 B; 120/9 R; 120/9 A; 120/146; 120/25 R
[58] Field of Search ................................ 126/25 B, 146, 126/25 R, 9 R, 9 A, 145, 152 R

[56] References Cited

U.S. PATENT DOCUMENTS

| | | |
|---|---|---|
| 1,919,407 | 7/1933 | Wood . |
| 2,843,105 | 7/1958 | Badish ............................ 126/25 B |
| 2,939,773 | 6/1960 | Rymer . |
| 2,949,209 | 8/1960 | Schott . |
| 3,028,228 | 4/1962 | Chaplin . |
| 3,060,868 | 10/1962 | MacLachlan . |
| 3,073,263 | 1/1963 | Wynkoop . |
| 3,112,716 | 12/1963 | Knight . |
| 3,116,704 | 1/1964 | Byars et al. . |
| 3,121,408 | 2/1964 | Haning . |
| 3,122,109 | 2/1964 | Waugh . |
| 3,167,040 | 1/1965 | Byars et al. . |
| 3,168,062 | 2/1965 | Arnold . |
| 3,177,826 | 4/1965 | Cohen . |
| 3,191,556 | 6/1965 | Hottenroth et al. . |
| 3,192,918 | 7/1965 | Ridgway . |
| 3,209,712 | 10/1965 | Arena . |
| 3,216,379 | 11/1965 | Durfee . |
| 3,240,172 | 3/1966 | Romberg et al. . |
| 3,296,984 | 1/1967 | Durfee . |
| 3,307,506 | 3/1967 | Rose . |
| 3,339,505 | 9/1967 | Bean . |
| 3,370,582 | 2/1968 | Rauh . |
| 3,413,935 | 12/1968 | Behrns . |
| 3,453,975 | 7/1969 | Gunter . |
| 3,494,349 | 2/1970 | Allen . |
| 3,499,399 | 3/1970 | Kaufmann . |
| 3,529,557 | 9/1970 | Treanor . |
| 3,590,755 | 7/1971 | Niemann . |
| 3,734,034 | 5/1973 | Fowler . |
| 3,739,732 | 6/1973 | Graham . |
| 3,765,397 | 10/1973 | Henderson . |
| 3,799,141 | 3/1974 | Simmer . |
| 3,814,035 | 6/1974 | Miller . |
| 3,865,052 | 2/1975 | Streets et al. . |
| 3,884,214 | 5/1975 | Duncan . |
| 3,903,866 | 9/1975 | Polinski . |
| 3,934,520 | 1/1976 | Brennan et al. . |
| 3,957,455 | 5/1976 | Clark . |
| 3,974,821 | 8/1976 | Storandt . |
| 4,023,553 | 5/1977 | London et al. . |
| 4,026,265 | 5/1977 | Spadaro . |
| 4,094,649 | 6/1978 | Osterried . |
| 4,102,317 | 7/1978 | Shonnard et al. . |
| 4,130,103 | 12/1978 | Zimmerman . |
| 4,175,925 | 11/1979 | Paek et al. . |
| 4,227,510 | 10/1980 | Frazier et al. . |
| 4,282,854 | 8/1981 | Byars . |
| 4,311,130 | 1/1982 | Noose . |
| 4,321,907 | 3/1982 | Sutter . |
| 4,331,125 | 5/1982 | Storandt . |
| 4,417,565 | 11/1983 | Karpinia . |
| 4,461,270 | 7/1984 | Sutter . |

(List continued on next page.)

FOREIGN PATENT DOCUMENTS

| | | |
|---|---|---|
| 1162123 | 2/1994 | Canada . |
| 2074309 | 10/1981 | United Kingdom . |

*Primary Examiner*—Larry Jones
*Attorney, Agent, or Firm*—Wallenstein & Wagner, Ltd.

[57] ABSTRACT

An apparatus (10) for igniting charcoal typically used on an outdoor grill is disclosed. The apparatus (10) includes a generally cylindrical housing (12), a charcoal support member (30) disposed therein, a heat shield (18) attached to the outside of the housing, and a first (20) and a second (24) handle which cooperate together to provide safer handling of the apparatus and charcoal briquettes.

21 Claims, 4 Drawing Sheets

U.S. PATENT DOCUMENTS

| | | |
|---|---|---|
| 4,503,835 | 3/1985 | Williams . |
| 4,510,916 | 4/1985 | Ogden . |
| 4,531,507 | 7/1985 | Gerson . |
| 4,567,876 | 2/1986 | Ogden . |
| 4,603,679 | 8/1986 | Ogden . |
| 4,604,986 | 8/1986 | Barnes . |
| 4,793,320 | 12/1988 | Bakie . |
| 4,909,237 | 3/1990 | Karpinia . |
| 4,953,533 | 9/1990 | Witt . |
| 5,197,455 | 3/1993 | Tessien . |
| 5,230,325 | 7/1993 | Williams ............................. 126/25 B |

CHARCOAL IGNITER

DESCRIPTION

1. Technical Field

This invention relates to an apparatus for assisting in the igniting of charcoal that is typically used on an outdoor grill, and more particularly, for a charcoal igniting chimney having a conical grate and an improved dual handle system for safer handling of the chimney and the charcoal briquettes.

2. Background of the Invention

Chimney-style igniters for charcoal briquettes are well known in the art. These devices typically include a chimney-style housing having a grate disposed therein for holding a number of charcoal briquettes, and a space under the grate for adding newspaper or other ignitable material for lighting the charcoal. These devices have been found to be an improvement over the use of hydrocarbon igniting fluid and electrical starters, both of which can be hazardous and inconvenient to use. Many of the prior art chimney charcoal igniters use a single handle system which can be both awkward and cumbersome to handle. Some of the prior chimney-style igniters are described below.

U.S. Pat. No. 5,197,455, issued Mar. 30, 1993 to Tessien, describes a charcoal starter having a spiral conical grate for holding charcoal. Tessien alleges that the conical configuration of his grate helps charcoal to ignite at a faster rate. Tessien's device, however, is cumbersome to handle when it is full of hot charcoal.

U.S. Pat. No. 3,296,984, issued Jan. 10, 1967 to Durfee, discloses a charcoal briquette igniter having a rectangular housing and a prismatically-shaped grate. The handle is located at the lower part of the housing where less heat is generated by the lit charcoal. Again, Durfee teaches a cumbersome system for handling the hot chimney.

U.S. Pat. No. 3,216,379, issued Nov. 9, 1965 to Durfee, describes a chimney having a cone-shaped grate. Durfee describes a single handle, preferably located at the lower portion of the chimney.

U.S. Pat. No. 4,277,510, issued Oct. 14, 1980 to Frazier et al., describes a charcoal briquette igniter including an upright container with an exterior handle, having a bottom plate with a plurality of openings for placing charcoal briquettes.

Canadian Patent No. 1,162,123 issued Feb. 14, 1984 to Paquette, describes a charcoal briquette lighter including a cylinder, a supporting grate therein for holding charcoal, and a cone-shaped deflector positioned at the bottom of the cylinder. The cone-shaped deflector allegedly increases the draft of air in the cylinder to assist in the ignition of the charcoal.

Other patents describing various forms of charcoal igniting chimneys include, for example, U.S. Pat. Nos. 4,503,835, 4,417,565, 4,461,270, 4,604,986, and 3,073,263, among many others.

Accordingly, there is a need for an improved charcoal igniting apparatus for lighting charcoal simply and quickly, while providing safe and efficient handling system for a chimney full of hot briquettes.

SUMMARY OF THE INVENTION

The present invention is directed to a charcoal briquette igniting apparatus having a generally cylindrical housing. The housing includes an interior and an exterior, an internal, annular channel therein and opposed openings at each end thereof. A charcoal support member is removably connected to the interior of the housing within the annular channel and a heat shield is connected to the exterior of the housing. A longitudinal, stationary first handle is also connected to the exterior of the housing, and a second transverse handle is further pivotally connected to the heat shield. The second handle is adapted to permit a user to both grip the stationary first handle with one hand and grip the second handle with the other hand so as to easily control the angular orientation of the housing. This two handle system allows for safe and easy manipulation of the housing, especially important when the housing is full of hot charcoal.

Other advantages and aspects of the present invention will become apparent upon reading the following description of the drawings and the detailed description of the invention.

BRIEF DESCRIPTION OF THE DRAWINGS

In order that the present invention may be understood, it will now be described by way of example, with reference to the accompanying drawings in which.

DETAILED DESCRIPTION

Figure 1:
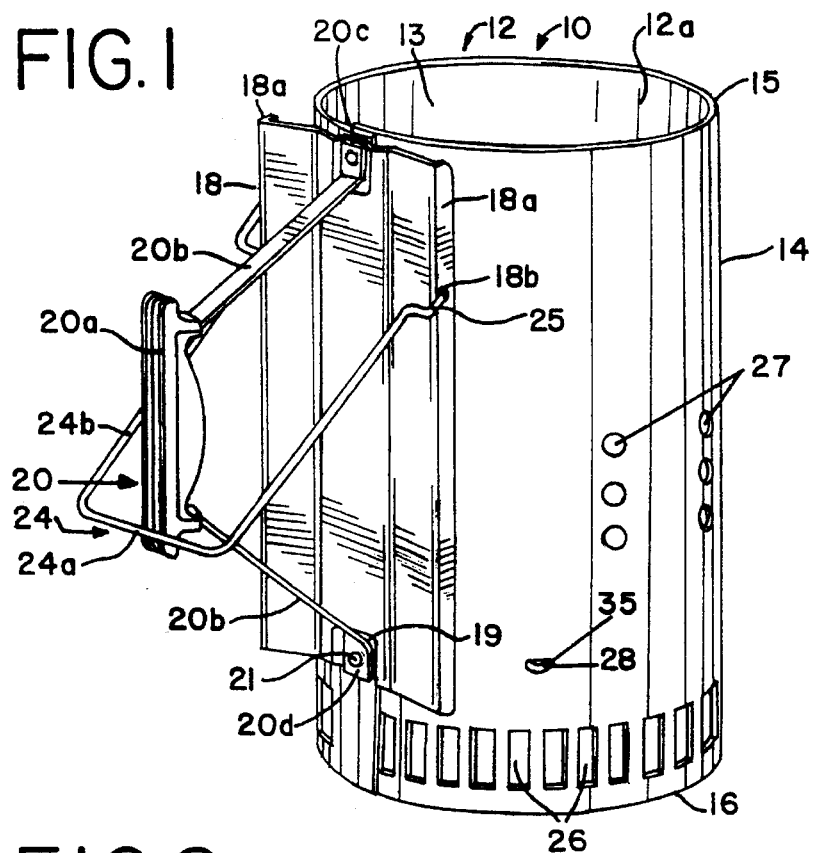
FIG. 1 is a side perspective view of the present invention oriented in the upright position.
Figure 2:
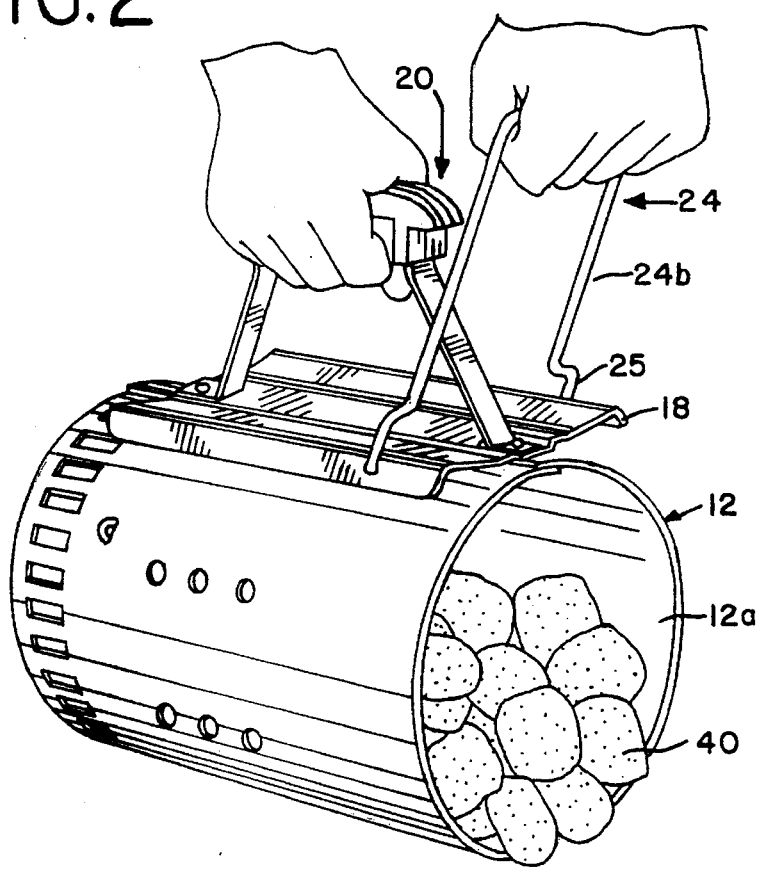
FIG. 2 is a perspective view showing the apparatus of FIG. 1 in use, with the first and second handles gripped.

While this invention is susceptible of embodiment in many different forms, there is shown in the drawings and will be herein described in detail a preferred embodiment of the invention with the understanding that the present disclosure is to be considered as an exemplification of the principles of the invention and is not intended to limit the broad aspects of the invention to the sole embodiment illustrated.

The charcoal igniting apparatus, generally designated by the reference numeral 10, is shown in FIG. 1. The apparatus 10 includes five primary components, that being a generally cylindrical housing 12, a charcoal support member 30 disposed therein (FIG. 8), a heat shield 18 attached to the outside of the housing 12, a first handle 20 and a second handle 24. The combination of these elements results in an improved charcoal igniting apparatus that is convenient, safe and easy to use.

In particular, the housing 12 can be any tubular member having openings at both the top end 15 and bottom end 16, including rectangular, square or octagonal. In use, the bottom end 16 of the housing rests upon the fuel grate of a grill 42. A round, generally cylindrical shape is preferred as it is conducive to heating and pouring out charcoal 40. The housing 12 is constructed from a flame resistant, lightweight material, such as corrosion resistant (aluminized) steel, stainless steel, or aluminum. As shown in the figures, the cylindrical housing 12 forms essentially an annular channel 12a having interior 13 and exterior 14 surfaces. Disposed around and through the periphery of the housing 12 is a plurality of vertically-oriented apertures 26 located adjacent the bottom end 16 of the housing 12. These apertures 26 allow air to reach the charcoal briquettes 40 and any fuel, such as newspaper, and assist in their ignition. Similarly, vertically aligned sets of spaced openings 27 are in the housing 12 adjacent the charcoal support member 30.

A tangential heat shield 18 and first 20 and second handles 24 are attached to the exterior 14 of the housing 12, while a charcoal support member 30 is attached to the interior 13 of the housing.

Figure 4:
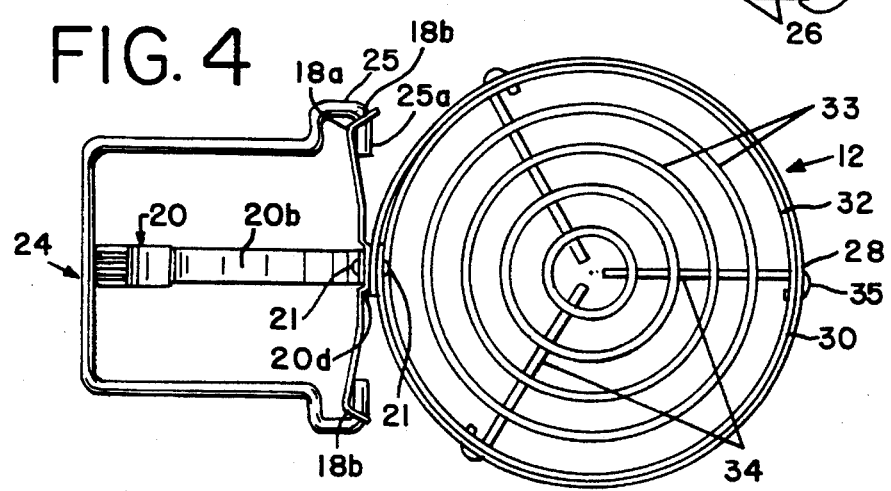
FIG. 4 is a top plan view of the apparatus of FIGS. 1–3.
Figure 5:
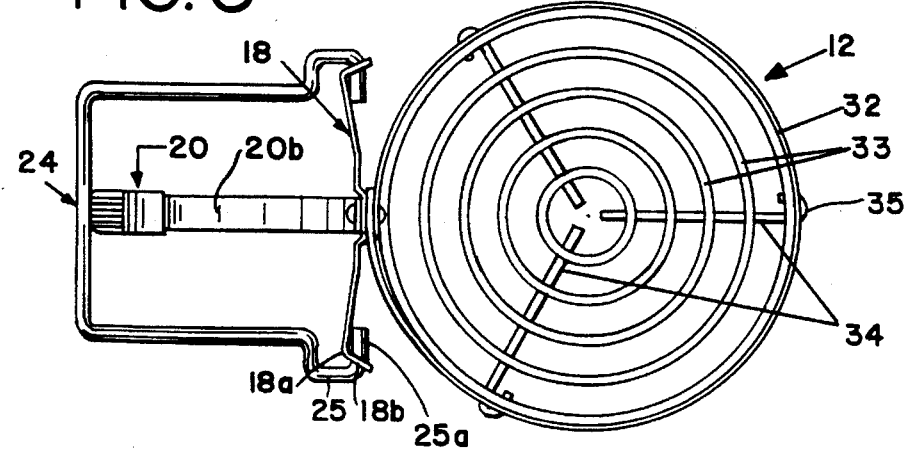
FIG. 5 is a bottom plan view of the apparatus of FIGS. 1–4.
Figure 7:
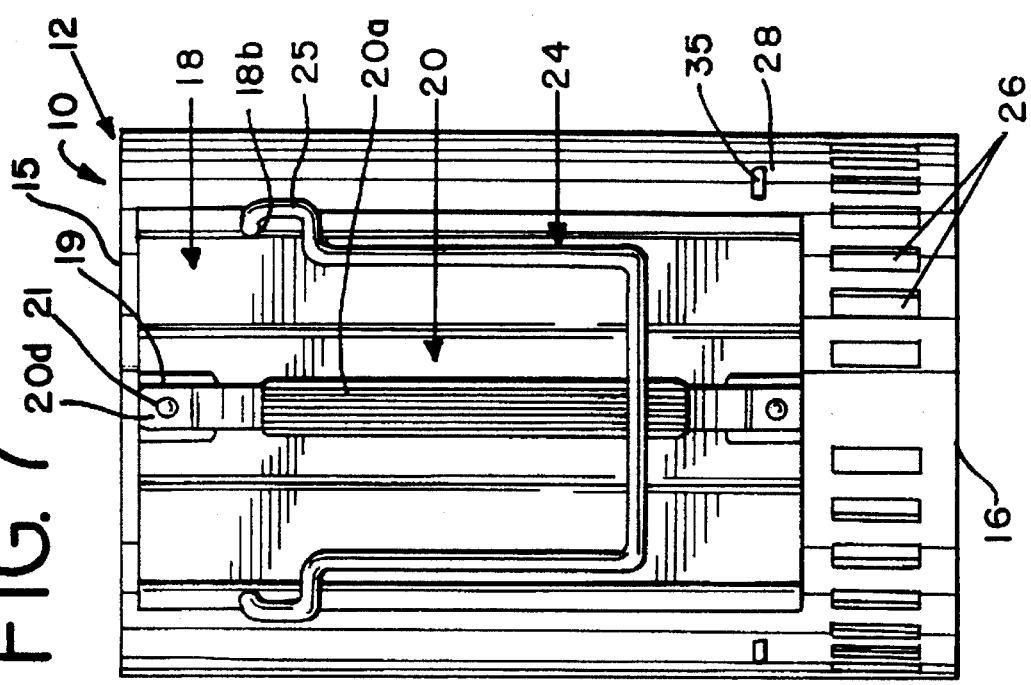
FIG. 7 is a back elevation view of the apparatus of FIGS. 1–6.
Figure 6:
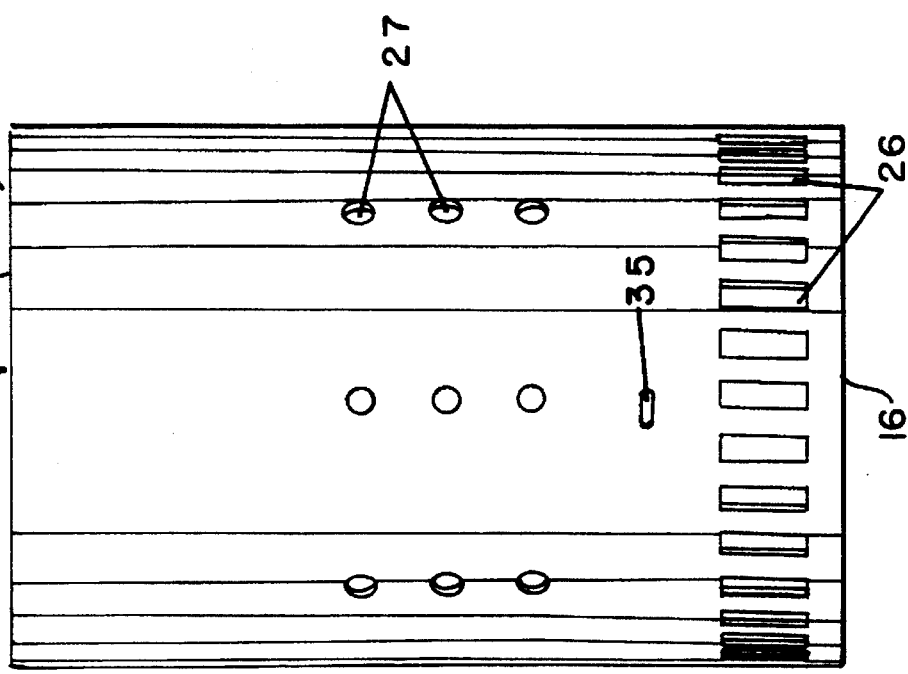
FIG. 6 is a front elevation view of the apparatus of FIGS. 1–5.
Figure 8:
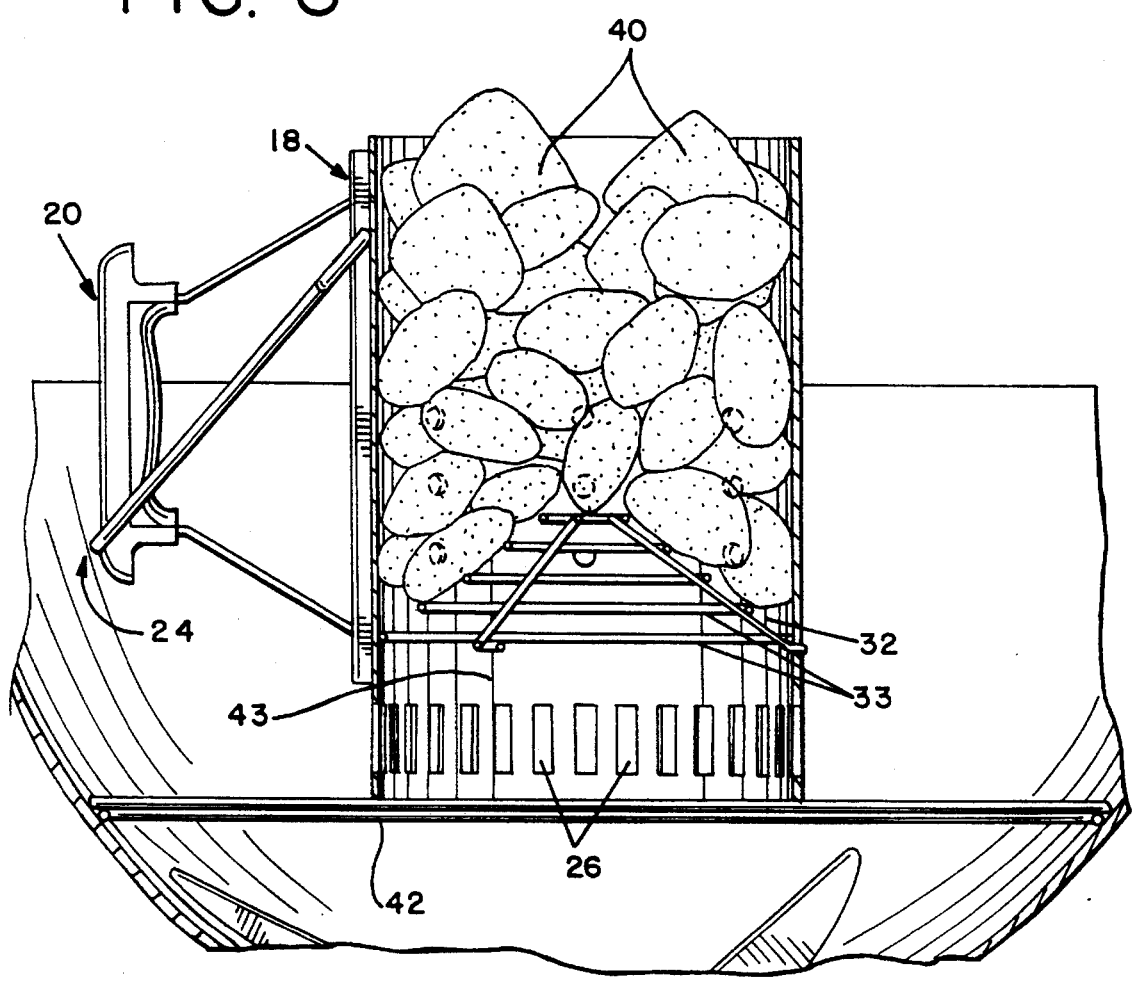
FIG. 8 is a sectional view showing the internal grate within the apparatus of FIGS. 1–7.

As shown in detail in FIG. 8, the charcoal support member 30 includes a grate 32 for supporting a plurality of charcoal briquettes 40 above the surface of a grill 42 when the apparatus 10 is placed on a surface during use. The grate 32 is generally positioned within the housing 12 in an area above the vertically oriented apertures 26. In this position, space 43 is left in the bottom of the housing 12 between the grate 32 and the grill surface 42 for placing paper, such as newspaper kindling, for lighting the charcoal 40. The grate 32 can be a flat, horizontal surface or a conical shape. A conical shape is preferred because it promotes slightly faster ignition of the charcoal 40 than the flat grate. As shown in FIGS. 4, 5 and 8, the grate 32 is preferably constructed from a plurality of separated, spaced parallel, concentric circular rods 33 of progressively decreasing circumference to form the conical shape. The grate 32 also includes a plurality of spaced longitudinal rods 34 connected to the concentric rods 33 for structural support. A hook-shaped protuberance 35 is positioned at one end of each longitudinal rod 34. These protuberances 35 cooperate with horizontal apertures 28 in the housing 12, allowing the grate 32 to be permanently retained to the housing. Consequently, the grate is easily secured and retained by the housing 12.

Mounted on the exterior surface 14 of the housing 12 is a heat shield 18, which protects the user's hand from the heat radiating from the housing 12 when the user grips the handles 20, 24. The heat shield 18 is mounted, preferably tangentially, to the housing 12 using any conventional securing means 21, such as rivets, screws or bolts. The legs 20b of the first handle 20 may also be secured to the housing 12 by the same securing means 21. For this purpose, the heat shield 18 includes embossed surfaces 19 for accommodating flanges 20d positioned at the distal ends 20c of the legs 20b of the first handle 20.

The heat shield 18 includes a pair of opposed marginal flanges 18a, which are angled away from the first handle 20 and outwardly from the main portion of the shield. The heat shield 18 is also constructed from a heat resistant material, such as corrosion resistant (aluminized) steel, or aluminum.

Figure 3:
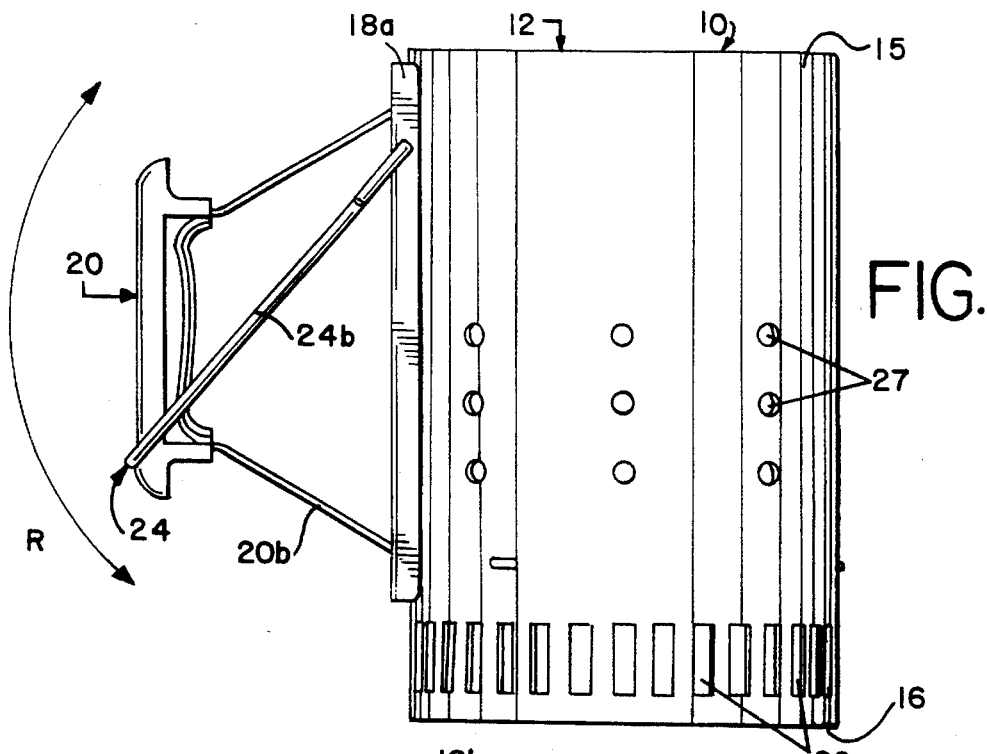
FIG. 3 is a side elevation view of the apparatus of FIGS. 1 and 2.

Attached to the heat shield 18 are a first handle 20 and a second handle 24, which cooperate together to provide, as noted previously, safer, easier, and more controlled handling of the housing 12. The first handle 20 is a stationary longitudinal handle having a gripping portion in the form of an insulated handle 20a. The insulated handle 20a, which includes serrations 20e for gripping, is constructed of a non-heat retaining or conducting material, such as wood or thermoplastic material. The insulated handle 20a is secured to the heat shield 18 and the exterior 14 of the housing 12 by two outwardly extending legs 20b. As noted previously, each leg 20b has a flange 20d positioned at the distal end 20c thereof for receiving a rivet 21, or any other suitable securing means, to secure the legs 20b to the housing 12. As shown in FIGS. 3 and 4, the housing 12 is formed of a single sheet that is over-lapped. The securement means 21 for the first handle 20 and shield 18 may also be used to secure the overlapping sheets forming the housing 12.

The second handle 24 has generally a U-shape, with a transverse gripping portion 24a having two elongated legs 24b extending outwardly from the ends thereof. Each leg 24b is pivotally connected to the heat shield 18 by a small U-shaped, integral connecting portion 25 having an extension 25a which inserts into an opening 18b in one of the opposed marginal flanges 18a (FIG. 4). As shown in FIG. 3, the second handle is both sized and shaped so as to rest on the first, insulated handle when the assembly is in the upright position. Specifically, in the upright position, the gripping portion 24a of the second handle 24 rests upon the handle portion 20a of the first handle 20. In this position, the second handle's gripping portion 24a is insulated from the heat and remains cool. In addition, for the same reason, the second handle 24 is preferably not connected directly to the housing 12. In use, the second handle 24 is free to pivot about the connection along the path, generally indicated R, shown in FIG. 3 between the resting position and the use position. By gripping the first handle 20a in one hand and the second handle 24 in the other hand, the user's hands are protected from the heat generated by the coals 40. The positioning of the first 20 and the second handles 24 allows the user to easily and safely control the angular orientation of the housing for pouring out the white hot charcoal 40 onto the charcoal grate.

While a specific embodiment has been illustrated and described, numerous modifications are possible without departing from the spirit of the invention, and the scope of protection is only limited by the scope of the accompanying claims.

We claim:

1. A charcoal briquette igniting apparatus comprising:

a housing having an interior and an exterior, an internal, annular channel therein and opposed openings at each end thereof;

a charcoal support member permanently connected to said housing within said channel;

a heat shield connected to said exterior of said housing;

a stationary first handle connected to either said heat shield or said exterior of said housing and having a first gripping portion oriented parallel to the longitudinal central axis of said housing; and, a second handle pivotally connected to either said heat shield or said exterior of said housing and having a second gripping portion angularly oriented relative to said first gripping portion of said first handle and adapted to permit a user to grip said stationary first gripping portion of said first handle with one hand, grip said second gripping portion of said second handle with the other hand, and control the angular orientation of said housing using both handles simultaneously.

2. The igniting apparatus of claim 1 wherein said heat shield further includes a pair of opposed marginal flanges and said second handle includes a gripping portion with legs extending outwardly from opposed sides thereof, each said leg being pivotally connected to one said marginal flange.

3. The igniting apparatus of claim 2 wherein said second handle is generally U-shaped and said housing includes a plurality of apertures therein below said charcoal support members.

4. The igniting apparatus of claim 1 wherein said first handle includes a gripping portion and a connecting portion projecting outwardly therefrom securing said gripping portion to said exterior of said housing, said heat shield being disposed between said gripping portion of said first handle and said housing.

5. The igniting apparatus of claim 4 wherein said second handle pivots between a first position and a second position with said gripping portion of said second handle resting upon said gripping portion of said first handle in said first position and being spaced from said housing in said second position.

6. The igniting apparatus of claim 1 wherein said gripping portion of said first handle has heat insulation means attached thereto.

7. The igniting apparatus of claim 1 wherein said charcoal support member is a conical grate adapted for holding a plurality of briquettes.

8. The igniting apparatus of claim 7 wherein said conical grate includes a plurality of separated, spaced parallel circular rods of progressively decreasing circumference.

9. The igniting apparatus of claim 1 wherein said conical grate includes a plurality of spaced longitudinal rods, each secured to each circular rod with a protuberance at one end thereof cooperating with an aperture in said housing for permanently connecting said grate to said housing.

10. A charcoal briquette igniting apparatus comprising:

a housing having an interior and an exterior, an internal, annular channel therein and opposed openings a bottom end and a top end thereof;

a charcoal support member permanently connected to said interior of said housing within said channel, said housing including a plurality of apertures therein below said charcoal support members;

a generally tangential heat shield connected to said exterior of said housing having a pair of opposed marginal flanges;

a stationary longitudinal first handle having a gripping portion and a connecting portion projecting outwardly therefrom securing said gripping portion to one of said heat shield and said exterior of said housing; and, a second handle being generally U-shaped including a transverse gripping portion with legs extending outwardly from opposed sides thereof, each said leg being pivotally connected to one said marginal flange said heat shield and adapted to permit a user to grip said stationary first handle with one hand, grip said second handle with the other hand, and easily control the angular orientation of said housing, said second handle further pivoting between a first position and a second position with said gripping portion of said second handle resting upon said gripping portion of said first handle and spaced from said housing when said second handle is in said second position.

11. The igniting apparatus of claim 10 wherein said connecting portion of said first handle gripping portion is secured to said exterior of said housing adjacent said heat shield.

12. The igniting-apparatus of claim 10 wherein said gripping portion of said first handle has heat insulation means attached thereto.

13. The igniting apparatus of claim 10 wherein said charcoal support member is a conical grate adapted for holding a plurality of briquettes.

14. The igniting apparatus of claim 13 wherein said conical grate includes a plurality of separated, spaced parallel circular rods of progressively decreasing circumference.

15. The igniting apparatus of claim 14 wherein said conical grate includes a plurality of spaced longitudinal rods, each secured to each circular rod with a protuberance at one end thereof cooperating with an aperture in said housing for permanently connecting said grate to said housing.

16. The igniting apparatus of claim 15 wherein said housing includes a plurality of apertures therein adjacent said conical grate.

17. A charcoal briquette igniting apparatus comprising:

a generally cylindrical housing having opposed open ends, an inner and an outer surface and a plurality of circumferential vents adjacent one said open end;

a charcoal support member permanently connected to said housing;

a tangential heat shield disposed on said outer surface of said housing having a pair of inwardly flanges;

a first handle member having a gripping portion and two legs with each leg being connected to said housing adjacent one said open end;

a generally U-shaped second handle member comprising two outer elongated legs interconnected by a third cross leg, each said outer leg pivotally connected to one said flange of said heat shield.

18. The igniting apparatus of claim 17 wherein said charcoal support member is a conical grate adpted for holding a plurality of charcoal.

19. The igniting apparatus of claim 17 wherein said conical grate includes a plurality of separated, spaced parallel circular rods of progressively decreasing circumference.

20. The igniting apparatus of claim 17 wherein said conical grate includes a plurality of spaced longitudinal rods, each secured to each circular rod with a protuberance at one end thereof cooperating with an aperture in said housing for permanently connecting said grate to said housing.

21. The igniting apparatus of claim 17 wherein said second handle pivots between a first position and a second position with said gripping portion of said second handle resting upon said gripping portion of said first handle in said first position and being spaced from said housing in said second position.

* * * * *